Jan. 13, 1959     C. R. PRICE     2,868,490

BEAM CLIP AND SUSPENSION DEVICE

Filed May 9, 1956

*INVENTOR:*
CARL R. PRICE
BY
Marshall, Johnston, Cook & Root
ATT'YS

# United States Patent Office

2,868,490
BEAM CLIP AND SUSPENSION DEVICE

Carl R. Price, Omaha, Nebr.

Application May 9, 1956, Serial No. 583,814

4 Claims. (Cl. 248—228)

This invention relates to a beam clip and suspension device for hanging or supporting building construction elements, such as electrical fixtures, pipes, and the like.

The device of the present invention comprises a clip member embodying a pair of oppositely disposed sections which are adapted to be pivotally connected together and applied along the opposite sides of the beam flanges which extend outwardly from each side of the beam web. One section is provided with a flat plate from which a side flange is bent to engage a beam flange. The plate of this clip section is provided with a circular opening through which a stud screw or bolt depends downwardly. The stud screw or bolt is welded, or otherwise secured to the clip section. The other or second cooperating clip section is provided with a flat plate from which a side flange is turned. This second clip section is provided with an arcuate slot which extends inwardly from one side of its plate. The arcuate slot has its inner or closed end arranged intermediate the ends of the clip section and is open at one side. The two clip sections are adapted to be pivotally connected together at an extreme outer end corner thereof. The second clip section is adapted to be mounted on the beam so that its turned flange will engage the other or opposite flange of the beam. The clip member, comprising the two clip sections, is applied by first mounting the first section to one beam flange and applying the other clip section to the other beam flange. The second section is applied in place by merely swinging it on its pivot toward the first section. The two sections may be locked together by means of any convenient locking means, such as arranging a protuberance in one section receiving a recess in the other section. The two sections of the clip member or device of the invention are always secured together by means of being pivotally connected, and, in effect, comprise a unitary member.

It is the object of the present invention to provide a new and improved clip member comprising two clip sections which are pivotally connected together, one clip section having a stud screw or bolt secured thereto and depending therefrom, the other clip section being provided with an arcuate slot to receive the stem of the stud screw or bolt.

Numerous other objects and advantages will be apparent throughout the progress of the specification which is to follow.

The accompanying drawing illustrates a selected embodiment of the invention, and the views therein are as follows.

Figure 1:
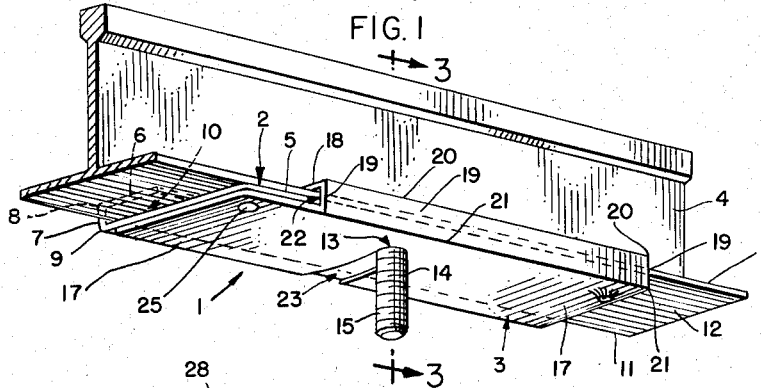
Fig. 1 is a detail perspective view showing the beam clip and suspension device of the invention applied to the bottom of an I-beam or girder.

The particular construction herein shown for the purpose of illustrating the invention comprises a beam clip and suspension device 1 comprising two clip sections 2 and 3 adapted to be mounted on, and secured to, a beam or girder 4.

The first clip section 2 comprises a plate 5 and a spaced, turned, parallel upper flange 6 integrally connected together by a side wall 7. The flange 6 is formed by bending the clip section 2 at the points indicated at 8 and 9, Figs. 2 and 4, whereby a recess or pocket 10 is formed between the bottom of the clip flange 6 and the top of the plate 5 to receive one of the flanges 11, 11 of the bottom 12 of the beam or girder 4.

The first clip section 2 has a hole or opening 13 provided therein intermediate its ends and between the side edges of the plate 5 to receive a stud 14 having a threaded stem section 15 and a head 16. The underside of the head 16 engages the upper side of the plate 5, and the threaded stem 15 depends downwardly a predetermined distance, as clearly shown in Figs. 1, 3 and 4.

The second section 3 of the clip member 1 comprises a plate 17 and a spaced, turned, parallel upper flange 18 integrally connected together by a side wall 19. The top flange 18 is formed by bending the clip section 3 at 20 and 21, whereby a recess or pocket 22 is formed between the top of the plate 17 and the bottom of the flange 18. The pocket or recess 22 provides a space to receive the other of the flanges 11 of the bottom 12 of the beam 4.

The plate 17 of the second clip section 3 is provided with an arcuate slot 23 to receive the stem 15 of the stud screw 14. The slot 23 extends inwardly from one edge of the clip section 3 and is arcuate so as to receive the stud 14. The inner or closed end 24 of the arcuate slot, Fig. 2, is adapted to abut and bear against the stud 14 when the parts 2 and 3 of the clip member 1 are assembled together on the base 12 of the beam 4.

Figure 2:
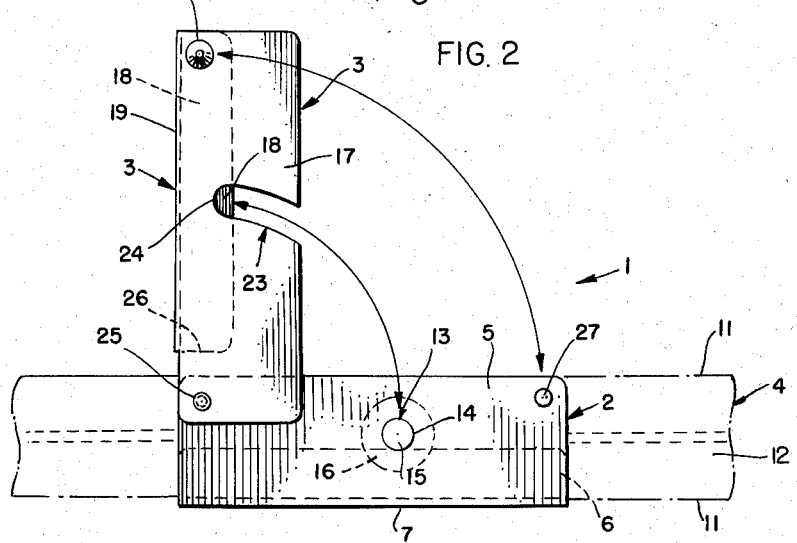
Fig. 2 is a detail bottom plan view showing an I-beam with the parts of the clip member in partly assembled position.

The two clip sections 2 and 3 are adapted to be pivotally connected together at 25 at an upper, outer corner of the two members, as clearly shown in Fig. 2. The one edge of the flange 18 of the clip section 3 is adapted to be cut away, as indicated at 26, Fig. 2, so that there will be no interference of the flange 18 with respect to the cooperating section 2 when the section 3 is swung on its pivot 25 during assembly of the parts in operative position on the beam 4.

The clip member 1 is adapted to be mounted in position on the flanges 11, 11 of the beam 4 by first slipping the section 2 in position laterally so that a flange 11 of the beam 4 will fit into the recess or pocket 10 with the upper side of its plate 5 engaging the underside of the beam, and the underside of the flange 6 engaging the upper side of the beam flange 11. The section 3 is swung at right angles to the section 2 as the section 2 is applied to the beam.

The section 3 of the beam clip member 1 is applied in position by swinging the section 3 on its pivot 25 so that the flange 11 of the beam 4 will be received in the pocket 22, whereupon the upper side of the plate 17 will be in contacting engagement with the underside of the plate 5, and the flange 18 of the clip section 3 will impinge upon the upper side of a beam flange 11. The arcuate slot 23 is so positioned in the plate 17 of the section 3 that the slot 23 will receive the stem 15 of the stud screw or bolt 14 when the section 3 is swung into position for engagement with the beam. The arcuate slot is such that when an arc is drawn from the pivot 25 to the center of the stud member 14, such arc will bisect the arcuate slot 23.

Figures 3, 4:
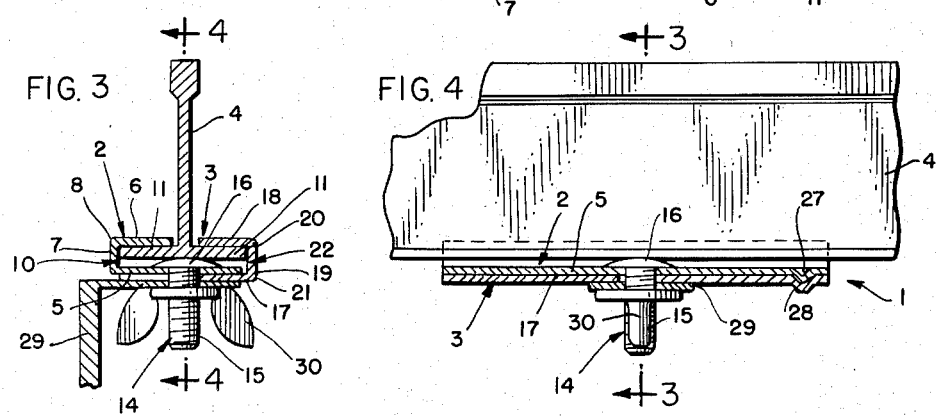
Fig. 3 is a detail vertical sectional view on the line 3—3 of Fig. 4.
Fig. 4 is a detail vertical sectional view at right angles to Fig. 3 and on the line 4—4 of Fig. 3.

The two sections 2 and 3 may be provided with interlocking means so that when the section 3 is swung to position, the two sections will be locked together. The interengaging means may comprise a protuberance 27 extending downwardly from the section 3 to engage a recess 28 formed in the section 3. Thus, when the two sections are brought together in assembled position, as shown in Figs. 1, 3 and 4, the protuberance or projection 27 will be received in the recess 28.

After the two sections 2 and 3 are applied in place, a hanger or other supporting element 29 for a lighting fixture, pipe, strap, or other element may be slipped over the stem 15 of the member 14 and then locked in assembled position by means of any convenient screw-threaded locking member 30, a wing nut being specifically shown.

The invention provides a clip member comprising two sections which are pivotally connected together, one section carrying a stud receivable in an arcuate slot formed in the other section, the two sections, when assembled, being snapped together by means of the cooperating interengaging means. The two sections are always secured together, and are adapted to be quickly and easily mounted in position and supported by the opposite flanges of the beam or girder.

Changes may be made in the form, construction and arrangement of the parts without departing from the spirit of the invention or sacrificing any of its advantages, and the right is hereby reserved to make all such changes as fall fairly within the scope of the following claims.

The invention is hereby claimed as follows:

1. A beam clip and hanger for application to flanges projecting from a beam web comprising a first clip section having a base plate adapted to lie beneath the bottom of said beam, a flange bent from said base plate and adapted for engagement with the upper surface of one of said beam flanges, a threaded bolt passing through said base plate and depending downwardly therefrom, a second clip section having a base plate adapted to lie against the base plate of the first clip section, and a flange bent from said base plate of the second clip section and adapted for engagement with the upper surface of the other of said beam flanges, said second clip section having an arcuate slot extending from a point intermediate the ends of the second section and continuing arcuately completely through one side thereof to receive said depending bolt, said first and second sections being pivotally connected together at adjacent outer corners by a pivot connection, the bolt received within the arcuate slot when the second section is swung on the pivot connection toward the first section to closed position.

2. A sheet metal beam clip and hanger for application to flanges projecting from a beam web comprising a first sheet metal clip section having a base plate adapted to lie beneath the bottom of said beam, a sheet metal flange bent from said base plate and adapted for engagement with the upper surface of one of said beam flanges, a threaded bolt passing through said base plate and depending downwardly therefrom, a second sheet metal clip section having a base plate adapted to lie against the base plate of the first clip section, a sheet metal flange bent from said base plate of the second clip section and adapted for engagement with the upper surface of the other of said beam flanges, and means pivotally connecting the two sections together at adjacent corners thereof, said second section only having an arcuate slot formed therein commencing at a point near the center of the second section plate and ending through one side thereof to receive the bolt, said arcuate slot being of a shape and configuration to conform with an arc drawn from the center of the bolt to the pivotal connection of the two sections, said slot being wider than the bolt and extending an equal distance from each side of said arc, said bolt having a head flattened on its underside and fixed to the upper side of the first section plate.

3. A beam clip and hanger for application to flanges projecting from a beam web comprising a first clip section having a base plate adapted to lie beneath the bottom of said beam, a flange bent from said base plate and adapted for engagement with the upper surface of one of said beam flanges, a threaded bolt passing through said base plate and depending downwardly therefrom, a second clip section having a base plate adapted to lie against the base plate of the first clip section, a flange bent from said base plate of the second clip section and adapted for engagement with the upper surface of the other of said beam flanges, and means pivotally connecting the two sections together at adjacent corners thereof, said second section having an arcuate slot formed therein commencing at a point near the center of the second section plate and ending through one side thereof to receive the bolt, said arcuate slot being of a shape and configuration to conform with an arc drawn from the center of the bolt to the pivotal connection of the two sections, said slot being wider than the bolt and extending an equal distance from each side of said arc, the flange of said section being shorter at its pivotally connected end to prevent interference with the first section during outward pivotal movement of the second section.

4. A beam clip and hanger for application to flanges projecting from a beam web comprising a first clip section having a base plate adapted to lie beneath the bottom of said beam, a flange bent from said base plate and adapted for engagement with the upper surface of one of said beam flanges, a threaded bolt passing through said base plate and depending downwardly therefrom, a second clip section having a base plate adapted to lie against the base plate of the first clip section, a flange bent from said base plate of the second clip section and adapted for engagement with the upper surface of the other of said beam flanges, means pivotally connecting the two sections together at the corners thereof, said second section having an arcuate slot formed therein commencing at a point near the center of the second section plate and ending through one side thereof to receive the bolt, said arcuate slot being of a shape and configuration to conform with an arc drawn from the center of the bolt to the pivotal connection of the two sections, said slot being wider than the bolt and extending an equal distance from each side of said arc, said bolt having a head flattened on its underside and fixed to the upper side of the first section plate, and interlocking means on said sections, said last named means comprising a protuberance on one section receivable in a recess in the other section.

References Cited in the file of this patent
UNITED STATES PATENTS

| | | |
|---|---|---|
| 734,275 | Lyon | July 21, 1903 |
| 752,996 | Nissenson | Feb. 23, 1904 |
| 1,030,574 | Ette | June 25, 1912 |
| 1,094,496 | Tuite | Apr. 28, 1914 |
| 1,179,150 | Whincup | Apr. 11, 1916 |
| 1,983,670 | Knight | Dec. 11, 1934 |
| 2,323,723 | Mushet | July 6, 1943 |
| 2,628,807 | Lincoln | Feb. 17, 1953 |
| 2,738,942 | Gantner | Mar. 20, 1956 |
| 2,765,139 | White | Oct. 2, 1956 |